H. D. RANKIN.
APPARATUS AND METHOD FOR PRODUCING NITRIC ACID.
APPLICATION FILED SEPT. 19, 1903.
1,150,786.
Patented Aug. 17, 1915.
4 SHEETS—SHEET 4.
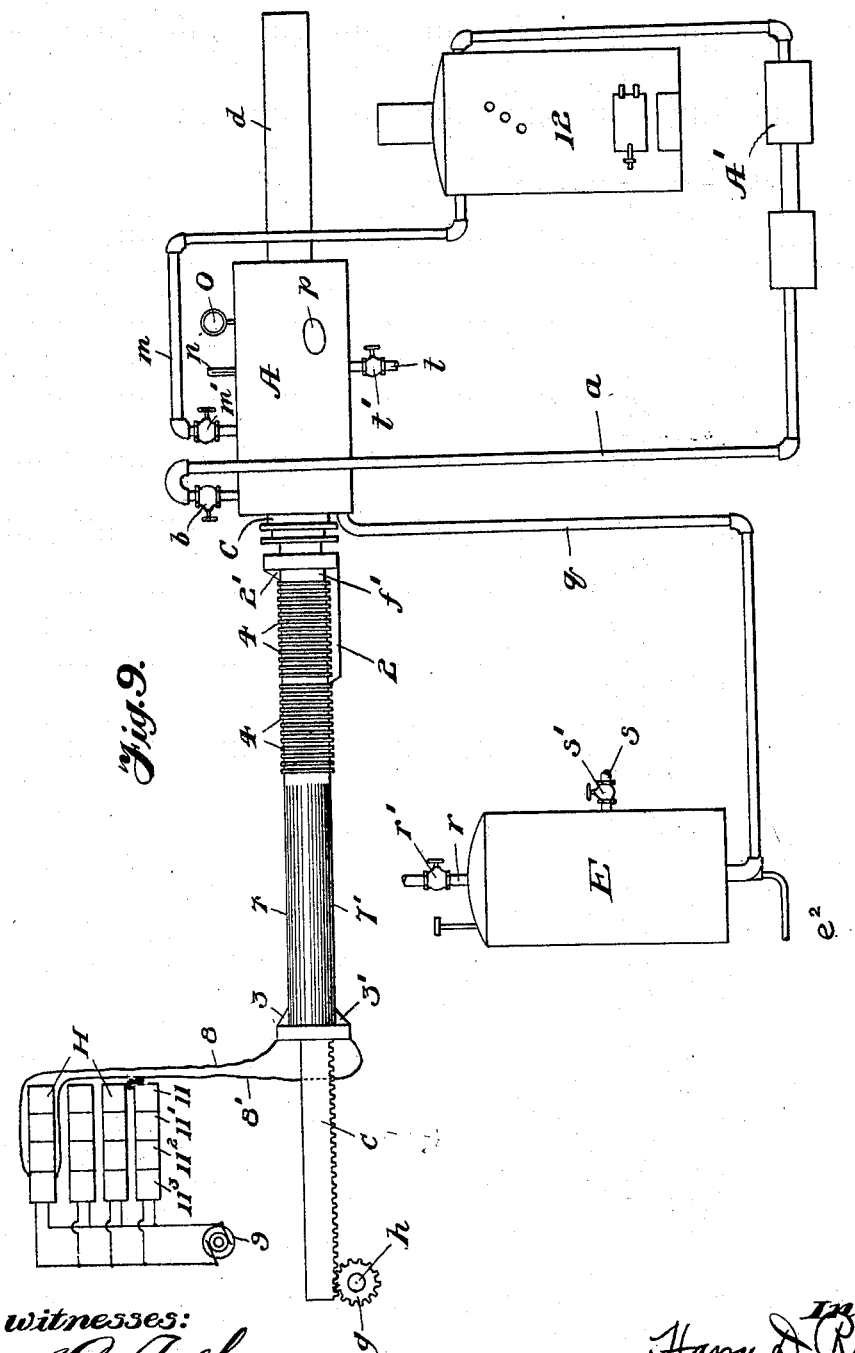

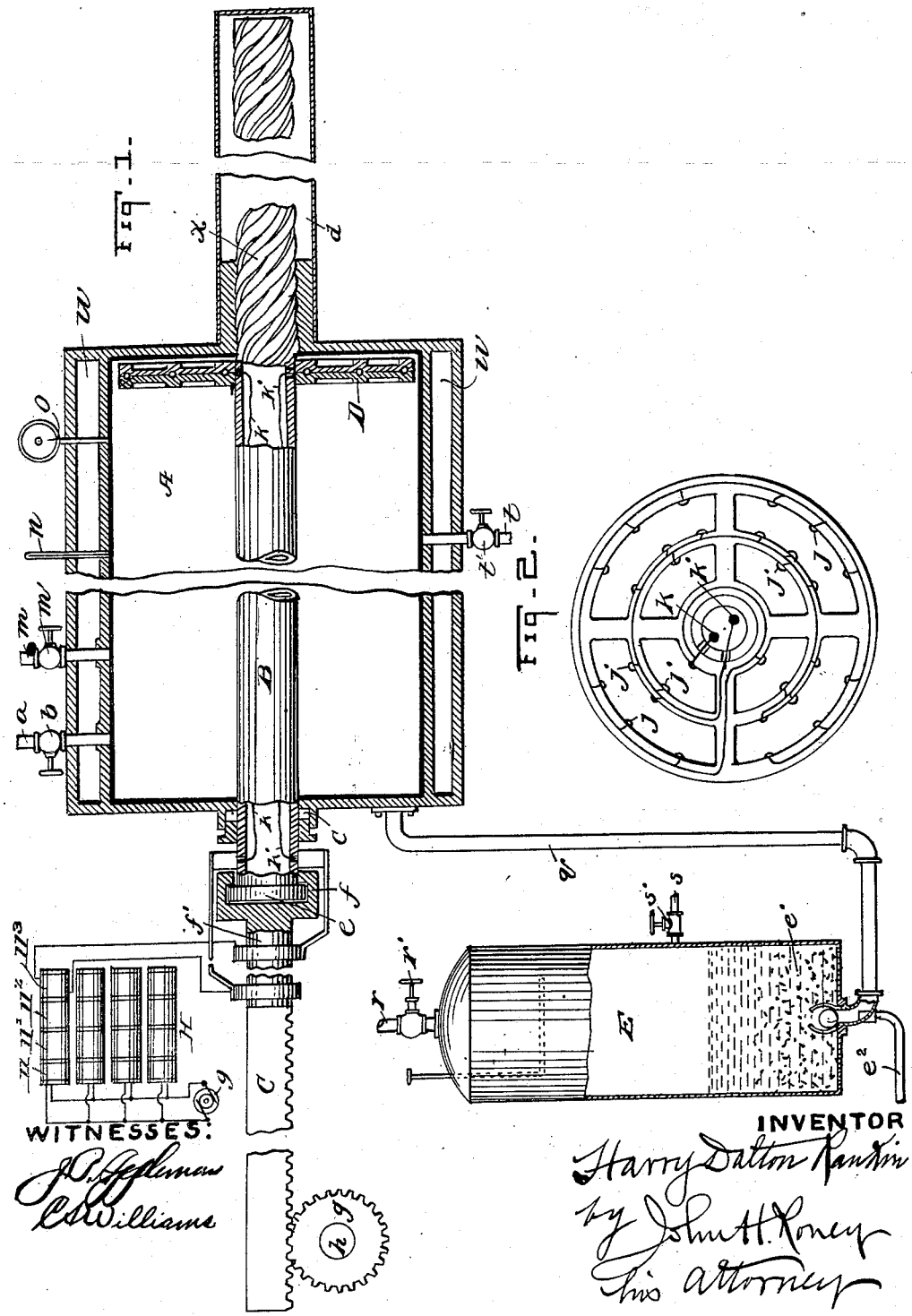

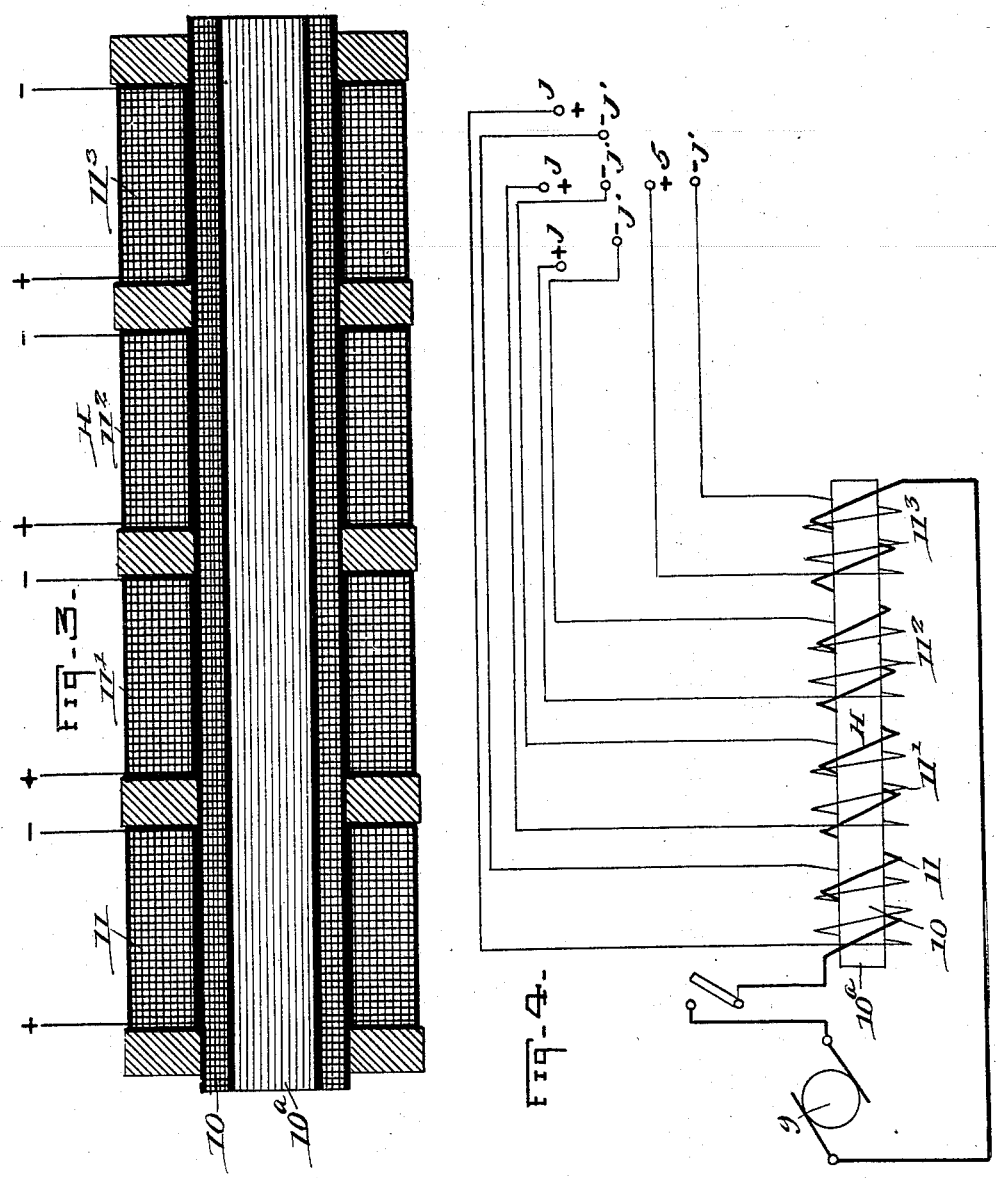

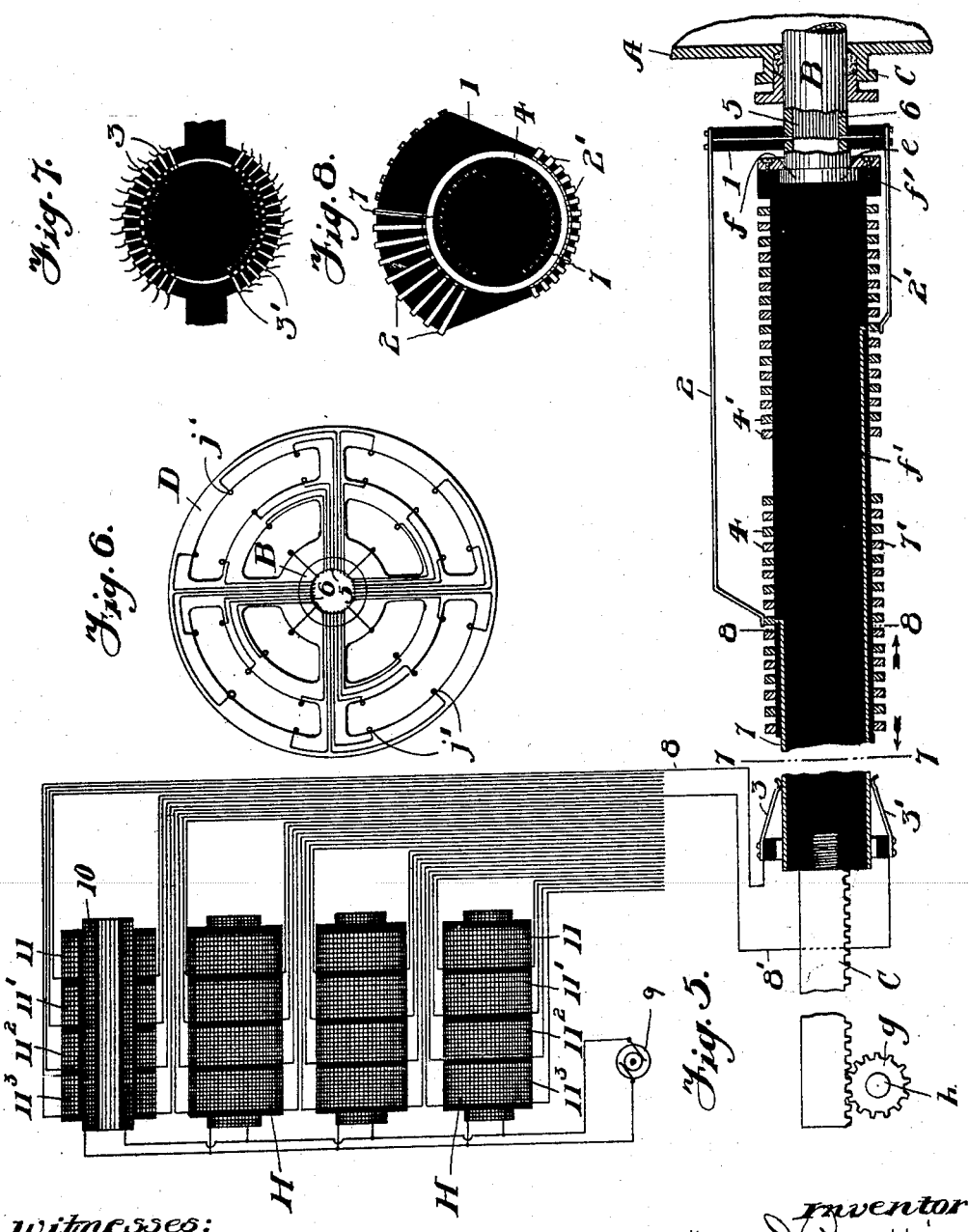

UNITED STATES PATENT OFFICE.

HARRY DALTON RANKIN, OF PITTSBURGH, PENNSYLVANIA, ASSIGNOR TO RANKIN PROCESS COMPANY, OF PHOENIX, ARIZONA, A CORPORATION OF ARIZONA.

APPARATUS AND METHOD FOR PRODUCING NITRIC ACID.

1,150,786.  Specification of Letters Patent.  Patented Aug. 17, 1915.

Application filed September 19, 1903. Serial No. 173,797.

*To all whom it may concern:*

Be it known that I, HARRY DALTON RANKIN, a citizen of the United States, residing at Pittsburgh, in the county of Allegheny and State of Pennsylvania, have invented a new and useful Improvement in Apparatus and Methods for Producing Nitric Acid, of which improvement the following is a specification.

My invention relates to an apparatus and process for producing nitric acid.

The object of my invention is to produce nitric acid, by subjecting atmospheric air or a mixture of oxygen and nitrogen under compression, to the action of an electric arc or flame, whereby the nitrogen of the air or compound is transformed into the higher oxids of nitrogen, and ultimately converted from said higher oxids *i. e.*, the tri and tetra oxids of nitrogen into nitric acid by treatment with a suitable reagent. In the accompanying drawings, is illustrated a type of apparatus adapted to carry out the process specified. The said apparatus comprises an induction coil or a series of induction coils, each of which comprises a single primary and a plurality of secondary fields; a rotary reciprocating shaft, located or disposed in the vessel, and carrying a terminal head or disk, provided with negative and positive terminal points or electrodes, which are separated from each other a graduated and predetermined distance, so that the electric current which is carried to the electrodes or terminals, causes an arc flame between the terminals or electrodes for the purpose of oxidizing or converting atmospheric air or a mixture of oxygen an nitrogen brought in contact therewith into the higher oxids of nitrogen; and a vessel or apparatus adapted to contain reagents, whereby these higher oxids are converted into nitric acid, with the least possible expenditure of energy. The said apparatus is illustrated in the accompanying drawings, which is hereinafter more fully described, reference being had to said drawings, in which—

Figure 1 indicates a diagrammatic view of a portion of my improved apparatus for producing nitric acid. Fig. 2 is a front elevation of the terminal or disk head. Fig 3 is a longitudinal section of one of the induction coils. Fig. 4 is a diagrammatic view of the circuit from one of the coils to the terminals of the disk head. Fig. 5 is a diagrammatic view of the four series of induction coils with the circuits therefrom to the contacts or brushes on the reciprocatory shaft. Fig. 6 is a front elevation of the terminal or disk head, showing the terminal points of all the circuits thereto. Fig. 7 is a section taken on line 7—7 of Fig. 5. Fig. 8 is a section taken on line 8—8 of Fig. 5. Fig. 9 is a diagrammatic view of my apparatus.

Referring to said drawings, A is a vessel adapted to contain atmospheric air under compression, being connected with a pump, or compresser A', by means of a pipe *a*, which may be provided with a suitable cock or valve *b*, to regulate the admission of air to said vessel. The pump A' constitutes no part of the present invention and is merely shown diagrammatically upon the drawing. This pump may be of any suitable construction and merely serves as a means for forcing air into the vessel A. One end or head of said vessel is provided with a stuffing box *c*, and the opposite end with a hollow shaft or bearing *d*, in which the spirally threaded end, *x*, of the centrally disposed hollow shaft B, projects and is supported. The opposite end of said shaft, B, projects through the stuffing box, *c*, and terminates in a shoulder *e*, which is revolubly secured in the socket *f*, formed in the enlarged insulated portion *f'*, of the rack bar C. The said hollow shaft, B, is adapted to be reciprocated through the vessel A, by means of the rack bar C, which meshes with the gear wheel *g*, which is mounted upon the power shaft *h*, and from the fact that one end of said hollow shaft is provided with a spiral thread *x* it is caused to revolve in the socket *f*.

The end of the shaft B carries an insulating ring 1, to which are connected the brushes or contacts 2, 2', which correspond in number with the brushes or contacts 3, 3', said brushes 2, 2' being in contact with or impact upon the respective electric conductors 4, 4', which are in the form of annulus or rings, mounted on the insulated portion *f'*, of the rack bar. By reference to Figs. 5 and 7 it will be observed that the brushes 3, 3' are supported by a rail 3ª of insulating material and are all insulated from each other. The reciprocating bar upon which the rings 4, 4' are mounted slides back and forth through the ring 3ª and the brushes 3, 3' engage corresponding longitudinally disposed contact strips 7, 7' which are insulated from each other and have electrical connection with the respective rings 4, 4'. The brushes 3, 3' are connected to the various terminals 8 of the corresponding secondary windings of the induction coils or transformers, an individual secondary winding being provided for each pair of the brushes 3, 3' and for each set of terminal points $j$, $j'$ on the disk D. Upon reciprocating the terminal head or disk D, which is rigidly mounted on said hollow shaft B, longitudinally of said vessel A, and rotating the same during its travel therein, every part of the air therein under compression is, for a specific time, depending upon the amount of compression, temperature of arc flame, etc., subjected to an electric arc or flame, which leaps from the terminal points, $j$, carried by said disk D, to the terminals $j'$, immediately opposite, producing a continuous intense yellowish to reddish flame arc from terminal to terminal on said head, and converting, by its action, the nitrogen and oxygen of the air first into $N_2O_2$, and then with decrease of pressure and of temperature by means of rheostat, and partial escape of gases from the vessel, into trioxid and tetra-oxid of nitrogen. The electric current is conveyed or carried to the said terminals $j$, $j'$, by means of multiple wire conductors $k$, $k'$, which pass from the brushes 2, 2', down through the insulated ring 1, into the hollow shaft B, thence to the different terminal points, the positive current passing from the brushes 2, and the negative current passing from the brushes 2'. The said brushes 2, 2', respectively, contact with the rings 4, and 4', respectively, and these rings are in contact with an equal number of contact plates 7 and 7', which are in contact with the longitudinally extending contacts or brushes 3 and 3', which are insulated from each other and in circuit with the different conductors 8 and 8' carrying the current from the various induction coils H, which are energized by the generator 9, or other source of electrical energy. It will be observed that the negative contacts and rings 3', 7', 4' and 2' are insulated from the positive contacts and rings 3, 7, 4, and 2 in contact therewith. It will also be observed that each of the induction coils comprises a core $10^a$, a primary, 10, and have independent secondary coils, 11, 11', $11^2$, $11^3$, whereby each set of negative and positive terminals $j$, $j'$ is provided with an independent circuit. While I have shown a particular form of induction coil 8, it will be obvious that any similar form of transformer for producing a current of high potential will answer all requirements. To increase the initial conductivity of the compressed air in the vessel when working under very high pressures, and thus enable the electric flame to complete or join in arc, by use of lower potential than would otherwise be required, a minute amount of steam or other form of moisture may be admitted to said vessel through the pipe $m$, which is provided with a cock $m'$, to regulate the admission of steam or other form of moisture thereto, though generally it is better to work air dry at reasonably low pressures, or about six to ten atmospheres. The vessel is provided with a thermometer $n$, to indicate the temperature of said vessel and contents; also with a pressure indicator $o$. A hollow glass globe $p$ is inserted in the side of the vessel, into which some of the nitrous compounds enter, an inspection of which enables the operator to determine the character of action taking place in the vessel. The nitrifying vessel is also connected to a boiler 12, by means of the pipe $m$, which is provided with a suitable valve $m'$, to regulate the admission of steam to said vessel, if it be desirable to admit the same. The said boiler, 12, is also connected with the compressor A'. The said vessel A is connected with the transforming vessel E by means of the pipe $q$, through which the tri and tetra oxids, formed in said vessel, are conveyed into said vessel E, and through the finely comminuted pulverulent material $e'$, comprising charcoal silica and platinum sponge, or black, and sulfuric acid. The sulfuric acid acts as an instantaneous absorber of oxids of nitrogen while water alone does not, and I therefore use the acid in combination with the water to instantly take up or absorb the oxids that may escape into it under pressure during the process, which would otherwise be carried off by the excess nitrogen present under pressure before the water could absorb said oxids. The sulfuric acid in addition to the function specified more rapidly converts oxids of nitrogen, when in the form of nitrous and hyponitrous acids, into nitric acid when a current of air is forced through them, than is possible with plain water solution, and to produce this action a current of air is forced into said chamber E by means of the injector $e^2$. A further function performed by the sulfuric acid is, that by reason of its greater affinity for water than nitric acid, it keeps the nitric acid when produced fairly concentrated, thus avoiding the necessity of reducing dilute acid to an article of commercial specific gravity (required in other methods); this is done by regulating the addition of water to the absorbing or transforming tank properly in accordance to the amount of oxids requiring the water molecule. Hence said acid serves three purposes, and with the water and air contained therein, said oxids are converted or transformed into nitric acid, the excess of nitrogen of the air, which remains mechanically mingled therewith, is separated and permitted to escape to the atmosphere through the pipe $r$, controlled by the valve $r'$, and the nitric acid drawn off through the pipe $s$, controlled by the valve $s$.

Any nitric acid if produced in the nitrifying chamber, A, directly because of any moisture absorbing any of the tri or tetra oxids of nitrogen, is drawn off through the pipe $t$, which has a valve or cock $t'$ therein for said purpose.

H is one of the high tension induction coils, or other form of transforming apparatus, so wound that one primary and four secondary conductors are formed, though any form of transformer, to obtain proper potential and current, will do, which is in circuit with the head or arcing points $j, j'$, thereon. A very high voltage is carried by the induction coil to be utilized in the arcing operation, but is so adjusted, with reference to terminal and gap or distance between discharge or terminal flame points to be arced over, that the arc is a solid yellowish to reddish tinged flame of highest possible heating and actinic or chemical effect.

In carrying out my method, atmospheric air is forced into the nitrifying vessel by a pump, compressor, or other suitable means until the requisite pressure is attained.

In Fig. 2 are shown two cables, $k$ and $k'$, each of which carries sixteen independent conductors. In Fig. 6 the circuits are shown independently arranged on the terminal head or disk, instead of as shown in Fig. 2, in which a sixteen wire cable is shown.

In carrying out my invention it is necessary to keep the vessels cool by means of a water jacket, expansion of ammonia, air, etc., for when heated too greatly the oxids formed in the nitrifying chamber may be decomposed into their original elements. For this purpose the chamber A may be surrounded by a water jacket W as indicated upon Fig. 1 of the drawing.

I claim as my invention and desire to secure by Letters Patent:

1. In an apparatus for producing nitric acid, the combination of a vessel adapted to contain air under compression, a head or disk operatively mounted therein and carrying electric conductors conveying current from a high tension induction coil, means to reciprocate and rotate said head simultaneously, a vessel connected with said first mentioned vessel, in combination with a high tension induction coil.

2. In an apparatus for producing nitric acid, the combination of an induction coil comprising a single primary field and a plurality of secondary fields, a vessel adapted to contain a mixture containing oxygen and nitrogen, means to compress the mixture in said vessel, a terminal head mounted in said vessel having terminal points, and means to convey or carry independent electric circuits from said induction coil to said terminal points.

3. In an apparatus for producing nitric acid, the combination of an induction coil comprising a single primary field and a plurality of secondary fields, a vessel adapted to contain atmospheric air, a terminal head mounted in said vessel having terminal points, electric conductors forming independent electric circuits from the induction coil to said terminal points, and means to reciprocate and rotate simultaneously said head.

4. In an apparatus for producing nitric acid, the combination of an induction coil, comprising a primary field and a plurality of secondary fields, a vessel adapted to contain atmospheric air under compresssion, a terminal head mounted in said vessel having relatively stationary terminal points, electric conductors connecting each of said terminal points and said induction coil, whereby independent circuits are established to said terminal points, and means to rotate and reciprocate said head simultaneously in said vessel.

5. In an apparatus for producing nitric acid, the combination of a vessel adapted to contain atmospheric air, a terminal head mounted in said vessel, an induction coil having a single primary field and a plurality of secondary fields, positive and negative terminals carried by said head, electric conductors connecting said coil and said terminals, and means to compress air in said vessel whereby the air is brought in contact with the electric flame caused by the passage of a current between the said terminals.

6. In an apparatus for producing nitric acid, the combination of an induction coil, a vessel adapted to contain atmospheric air, a terminal head or disk located in said vessel carrying series of positive and negative electrodes, means to transmit electric current to said electrodes from said coil to produce an arc flame between said electrodes, a transforming vessel for containing an absorbent, and means to transfer the oxids of nitrogen formed in said vessel to and through the transforming vessel.

7. In an apparatus for producing nitric acid, the combination of an induction coil, a vessel adapted to contain atmospheric air, a terminal head or disk located in said vessel carrying a series of positive and negative electrodes, means to transmit current to said electrodes from said coil to produce an electric arc between said electrodes, a transforming vessel for containing an absorbent, means to convey the oxids of nitrogen formed in said vessel to and through the transforming vessel, and means to admit air to said transforming vessel.

8. The herein described process of producing oxids of nitrogen which consists in subjecting a mixture of nitrogen and oxygen under pressure greater than atmospheric pressure to the action of an electric arc and rapidly cooling the oxids produced to prevent dissociation and decomposition thereof.

9. The herein described process of producing oxids of nitrogen which consists in subjecting a mixture of nitrogen and oxygen under pressure greater than atmospheric pressure to the action of an electric arc in the presence of suitable agents to increase the conductivity of the subjected mixture and rapidly cooling the oxids produced to prevent dissociation and decomposition thereof.

10. The process of producing nitric acid, which consists in passing a continuous electric arc through a vessel containing a mixture of oxygen and nitrogen, and passing the resulting oxids of nitrogen together with a supply of fresh air through suitable absorbents for converting the same into nitric acid.

11. In an apparatus of the character described, the combination of a vessel adapted to be closed, means to produce a plurality of continuous electric arcs within said vessel, means to bring a mixture containing oxygen and nitrogen in contact with said electric arcs, a transforming vessel containing absorbents, means to cool the nitrous oxids and convey the same to and through the absorbents contained in the transforming vessel.

12. The process of producing nitric acid, which consists in passing a continuous electric arc through a vessel containing a mixture of oxygen and nitrogen and passing the resulting oxids of nitrogen, together with a supply of fresh air through water in the presence of sulphuric acid.

13. The herein described process of producing nitric acid, which consists in passing a plurality of continuous electric arcs through a mixture containing oxygen and nitrogen, cooling the oxids of nitrogen so produced and passing the same through suitable absorbents.

In testimony whereof I have hereunto signed my name in the presence of two subscribing witnesses.

HARRY DALTON RANKIN.

In the presence of—
CLARENCE A. WILLIAMS,
JAMES C. HERRON